United States Patent
Kawano

(10) Patent No.: US 6,841,906 B2
(45) Date of Patent: Jan. 11, 2005

(54) VEHICLE-USE ALTERNATOR ENABLING ACCURATE CONTROL OF POSITION AND ATTITUDE OF THE ALTERNATOR DURING AN OPERATION OF MOUNTING THE ALTERNATOR IN A VEHICLE

(75) Inventor: Yusuke Kawano, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/807,296

(22) Filed: Mar. 24, 2004

(65) Prior Publication Data

US 2004/0189121 A1 Sep. 30, 2004

(30) Foreign Application Priority Data

Mar. 28, 2003 (JP) ........................................ 2003-089510

(51) Int. Cl.⁷ .............................................. H02K 5/00
(52) U.S. Cl. .............................. 310/89; 310/91; 310/42; 29/596
(58) Field of Search ............................. 310/89, 91, 42; 29/596

(56) References Cited

U.S. PATENT DOCUMENTS

| | | | | |
|---|---|---|---|---|
| 4,028,568 A | * | 6/1977 | Tatsumi et al. | ................ 310/91 |
| 4,288,712 A | * | 9/1981 | Hagenlocher et al. | ........ 310/91 |
| 4,849,665 A | * | 7/1989 | Kitamura et al. | ......... 310/68 D |
| 4,980,589 A | * | 12/1990 | Ochi et al. | ................. 310/68 D |
| 5,705,870 A | * | 1/1998 | Thomsen et al. | ............. 310/91 |
| 5,914,549 A | * | 6/1999 | Adachi et al. | ................. 310/89 |
| 6,504,280 B2 | * | 1/2003 | Trowbridge | ................... 310/91 |
| 6,600,248 B2 | * | 7/2003 | Hara et al. | ..................... 310/91 |

FOREIGN PATENT DOCUMENTS

| | | | | |
|---|---|---|---|---|
| JP | 07327336 A | * | 12/1995 | ............ H02K/5/26 |
| JP | A 11-262213 | | 9/1999 | |

* cited by examiner

Primary Examiner—Joseph Waks
(74) Attorney, Agent, or Firm—Oliff & Berridge, PLC

(57) ABSTRACT

An alternator for a vehicle has a housing that is formed with attachment holes in external portions of the housing, through which a carrier jig is passed, to support the alternator when it is being mounted in the vehicle. By forming a plurality of attachment holes oriented along a common axis, at respectively different positions on the exterior of the alternator housing, it can be ensured that the carrier jig reliably holds the alternator in a required attitude as it is moved into position for mounting, e.g., to be attached to a sloping side of the engine of the vehicle.

6 Claims, 5 Drawing Sheets

VEHICLE-USE ALTERNATOR ENABLING ACCURATE CONTROL OF POSITION AND ATTITUDE OF THE ALTERNATOR DURING AN OPERATION OF MOUNTING THE ALTERNATOR IN A VEHICLE

BACKGROUND OF THE INVENTION

1. Field of Application

The present invention relates to a vehicle-use alternator that is designed to be mounted in an automobile or truck.

2. Description of Prior Art

When a vehicle-use AC generator (in general, simply referred to as an alternator) is to be attached, in the process of assembling a vehicle, it is necessary to hold the alternator in a suspended condition as it is being moved into the required position for being mounted on the vehicle. Various arrangements can be envisaged to enable the alternator to be supported in such a suspended condition, for example by providing protrusion portions on the exterior of the alternator with holes formed in these protrusion portions, so that the holes can be used for suspending the alternator while it is being moved into the desired position for being mounted, e.g., in a location close to the vehicle engine.

In recent years, for example as described in Japanese patent No. 11-262213, pages 3~4, FIGS. 1~6, a side-mounted type of alternator has come into use, whereby the alternator is attached directly to an engine bracket at three or more points. With such a side-mounted alternator, it is necessary to accurately position a set of attachment holes of the alternator with respect to corresponding attachment holes formed in the engine bracket.

However when such a side-mounted alternator is being lowered towards such a required position, in a suspended condition, the problem arises that movement of the suspended alternator may be obstructed by the engine head, or by some other equipment that is located near the engine, e.g., when the engine head or some other piece of equipment protrudes above the location where the alternator is to be mounted (that is to say, extends above the outer ends of the attachment holes that are formed in the engine bracket). Similarly, horizontal movement of the suspended alternator, towards the required position for attachment to the engine bracket, may also be similarly obstructed. It may thereby become difficult or impossible to accurately align the attachment holes formed in the alternator with the attachment holes in the engine bracket.

Moreover, if the alternator is simply held suspended by chains, etc., when performing this positioning operation, it becomes difficult to maintain the alternator in a desired attitude, so that the alternator can be attached with a required angular orientation.

SUMMARY OF THE INVENTION

It is an objective of the present invention to overcome the above problems of the prior art, by providing a vehicle-use alternator whereby obstruction of movement of the alternator during an operation for mounting the alternator can be avoided, and whereby the alternator can be accurately maintained in a required attitude during the mounting operation.

To achieve the above objectives, the invention provides a vehicle-use alternator (referred to in the following simply as an alternator) having a housing that contains a rotor and stator and is formed with attachment holes for use during an operation of mounting the alternator in a vehicle, wherein the housing is formed with a plurality of carrier portions, each having at least one through-hole or groove formed therein, for use in supporting the alternator during the mounting operation. As a result, the alternator can be held supported on a rod-shaped carrier jig that is passed through the holes or within and below the grooves, during the mounting operation. The alternator can thereby be held in a desired attitude throughout the process of moving the alternator into the required position, and subsequent attachment of the alternator.

With such an alternator, preferably each of the through-holes or grooves constituting the carrier portions are oriented along a common axis. In that way, a carrier member which is of straight elongated form can be passed through each of the plurality of holes or grooves constituting the carrier portions, and the alternator can thereby be retained and supported on the carrier member. The alternator can thereby be moved towards a position at which it is to be attached, without that movement being obstructed by any equipment that is located above that attachment position, such as the engine head.

Furthermore with such an alternator, each of the holes or grooves constituting the carrier portions preferably has a central axis oriented in a direction that is other than parallel to an axis of rotation of the rotor of the alternator. In that way it becomes possible to maintain the alternator in an arbitrarily determined attitude while it is being moved towards an attachment position, while avoiding obstruction of that movement by other nearby equipment.

Moreover such an alternator can be configured with the aforementioned attachment holes having respective central axes in parallel with one another, and with each of the through-holes or grooves formed in the carrier portions having a central axis oriented in a direction that is other than parallel to the central axes of the attachment holes. In that way, the alternator can be moved towards the position at which it is to be mounted, by motion along a direction that is not parallel to the axes of the attachment holes. In addition, the outer faces of the attachment holes can be held oriented at a required angle of tilt while the alternator is being moved towards its mounting position, so that for example the alternator can readily be attached to a sloping side of an engine block.

Alternatively or in addition to such a configuration, the attachment holes can be oriented with their central axes oriented along a common direction that is other than parallel to an axis of rotation of the rotor of the alternator. This can also facilitate the attachment of the alternator in a side-mounted configuration on an engine block.

The carrier portions can be advantageously formed in one or more attachment stays of the alternator, i.e., with the attachment stays having respective ones of the attachment holes formed therein. In that way, it becomes unnecessary to alter an existing shape of a housing of the alternator, for the purpose of providing external protrusions, etc., through which the holes constituting the carrier portions would be formed, since these holes can be formed in pre-existing parts of the alternator that are necessarily incorporated to enable attachment of the alternator by means of bolts, etc. Thus, excessive increase in manufacturing cost of the alternator due to incorporation of the carrier portions can be avoided.

DESCRIPTION OF PREFERRED EMBODIMENTS

Figure 1:
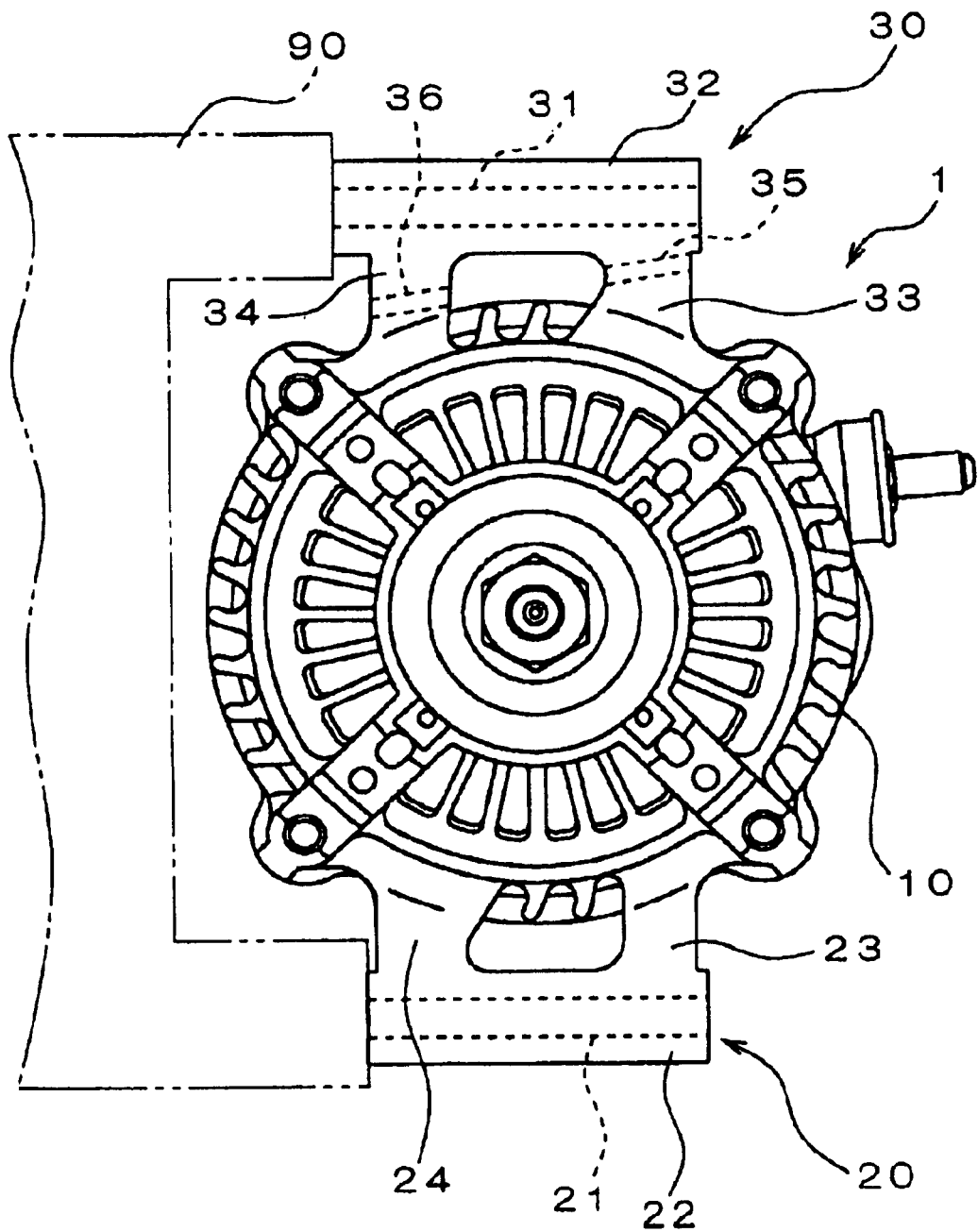
FIG. 1 is a front end view in elevation of an embodiment of a vehicle-use alternator.
Figure 2:
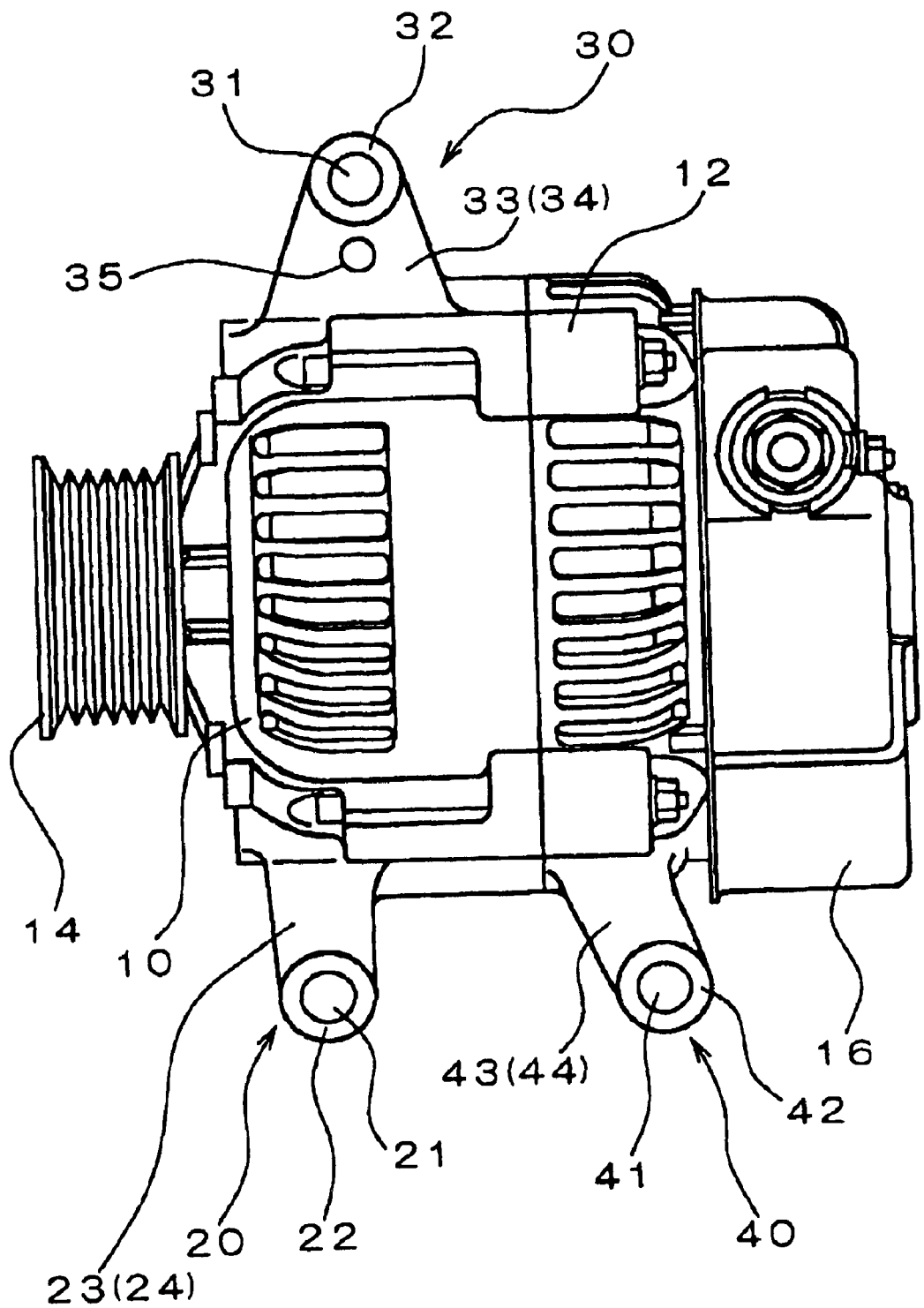
FIG. 2 is a side view in elevation of the alternator embodiment of FIG. 1.

An embodiment of a vehicle-use alternator will be described in the following, referring to the drawings. FIG. 1 is a view in elevation of one end of a vehicle-use alternator 1 (referred to in the following simply as the alternator 1), while FIG. 2 is a corresponding side view in elevation. These illustrate the alternator 1 mounted on an engine block 90 of a vehicle engine, with a side-mounting configuration whereby the alternator 1 is attached to the engine block 90 by bolts which each have a central axis (i.e., longitudinal axis) oriented in a direction at right angles to the axis of rotation of the rotor of the alternator. As shown, the alternator 1 has a housing formed of a front-end housing 10 and a rear-end housing 12, which enclose a stator and rotor (not shown in the drawings). A part of one end of the shaft of the rotor extends outward from the front-end housing 10, and has a pulley fixedly attached thereon, for transmitting power from the engine to drive the rotor.

The rear-end housing 12 has a rear cover 16 fixedly attached thereto, by screws, nuts, etc., with equipment such as diodes of a rectifier apparatus, brushes, a regulator, etc., (not shown in the drawings) being enclosed within the rear cover 16.

The front-end housing 10 is formed with attachment stays 20, 30 formed thereon, protruding radially outward from opposing sides, i.e., enclosing the axis of rotation of the rotor, as shown. The attachment stay 30 is formed of an attachment portion 32 having a bolt hole 31 formed therein, with the bolt hole 31 having a central axis that is oriented at right angles to the axis of rotation of the rotor of the alternator 1. The attachment stay 30 further includes two leg portions 33, 34 which attach the attachment portion 32 to the front-end housing 10. Through-holes 35, 36 for use as carrier holes in a mounting operation for attaching the alternator 1 to the engine block 90 (as described hereinafter) are formed in the leg portions 33, 34 respectively.

The attachment stay 20 is similarly formed of an attachment portion 22 having a bolt hole 21 formed therein, with the bolt hole 21 having a longitudinal (i.e., central) axis oriented at right angles to the axis of rotation of the rotor of the alternator 1. The attachment stay 20 further includes two leg portions 23, 24 which attach the attachment portion 22 to the front-end housing 10.

In addition, an attachment stay 40 is formed on the rear-end housing 12, protruding outward at a predetermined position. The attachment stay 40 is formed of an attachment portion 42 having a bolt hole 41 formed therein, with the bolt hole 41 having a central axis oriented at right angles to the axis of rotation of the rotor of the alternator 1. The attachment stay 40 further includes two leg portions 43, 44 which attach respective outer ends of the attachment portion 42 to the attachment stay 40.

Figure 3:
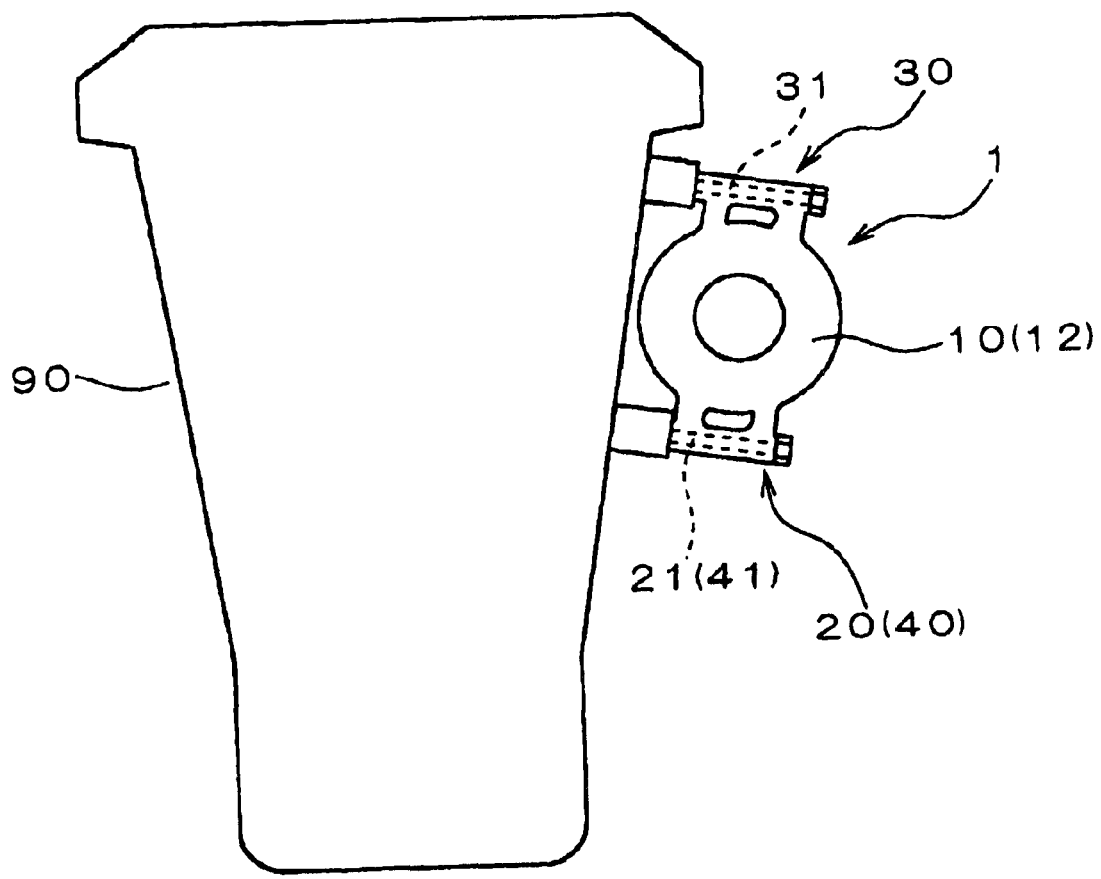
FIG. 3 is a diagram for illustrating a condition in which the embodiment is mounted on an engine block.

FIG. 3 is an end view illustrating how the alternator 1 is attached to the engine block 90, in a case in which the alternator 1 is mounted on a side of the engine block 90 that slopes with respect to the vertical direction. Bolts which pass through the bolt holes 21, 31 and 41 of the attachment stays 20, 30, 40 respectively are screwed into threaded holes (not shown in the drawings) that are formed in the engine block 90, to thereby fixedly attach the alternator 1 to the engine block 90.

Figure 4:
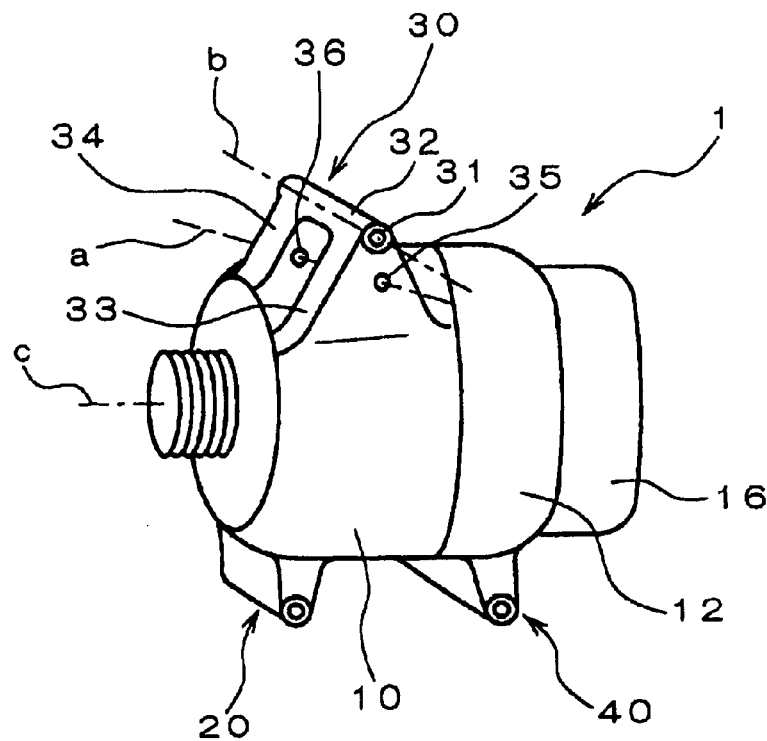
FIG. 4 is an oblique view of the embodiment, showing orientation relationships between carrier holes and bolt holes.
Figure 5:
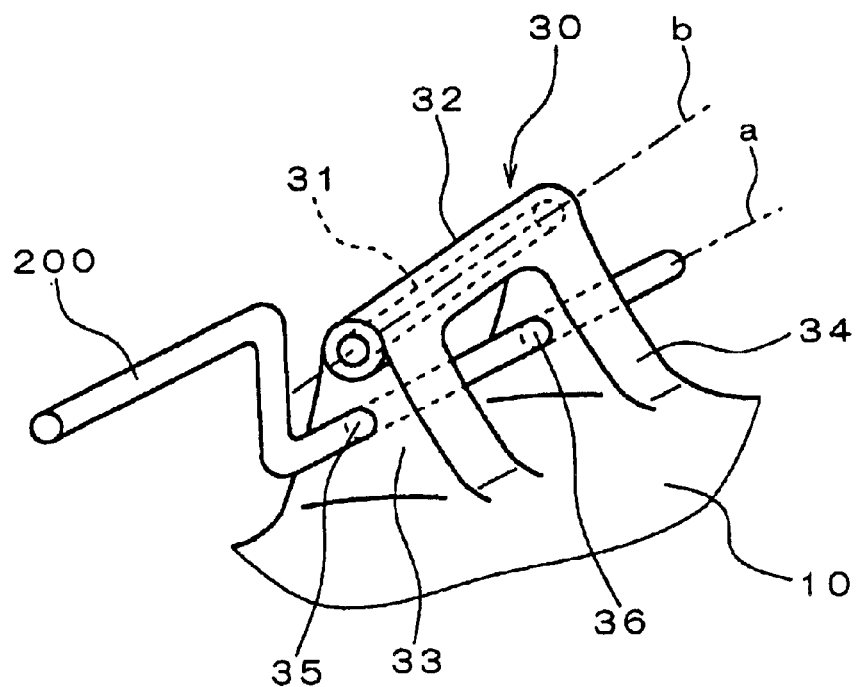
FIG. 5 is an expanded partial view showing an attachment stay of the embodiment, having carrier holes formed therein.

Details of the carrier holes 35, 36 formed on the leg portions 33, 34 of the attachment stay 30 will be described in the following. FIG. 4 is an oblique view of the alternator 1, showing the position and orientation relationships between the carrier holes 35, 36. FIG. 5 is a partial expanded view showing how the carrier holes 35, 36 are formed in the attachment stay 30, and illustrating the use of a carrier jig 200.

As shown in FIG. 4, the carrier hole 35 formed in the leg portion 33 has a central axis that coincides with the central axis of the other carrier hole 36 which is formed in the leg portion 34, i.e., with these axes lying along a common axis that is designated by the letter "a" in FIGS. 4 and 5. As shown in FIG. 5, a carrier jig 200 has a rod-shaped straight portion, which is of appropriate diameter for passing through each of the carrier holes 35 and 36. During an operation for mounting the alternator 1 on the engine block 90, the carrier jig 200 is inserted successively through the carrier holes 35, 36, i.e., along the common central axis of these holes, as illustrated, and is then used to support and move the alternator 1 during the mounting operation. Also as illustrated in FIGS. 5, 6, the common central axis "a" of the carrier holes 35, 36 is oriented along a direction which is not parallel to the central axis "b" of the bolt hole 31 that is formed in the attachment stay 30, and which is also not parallel to the axis of rotation "c" of the rotor of the alternator 1.

Figure 6:
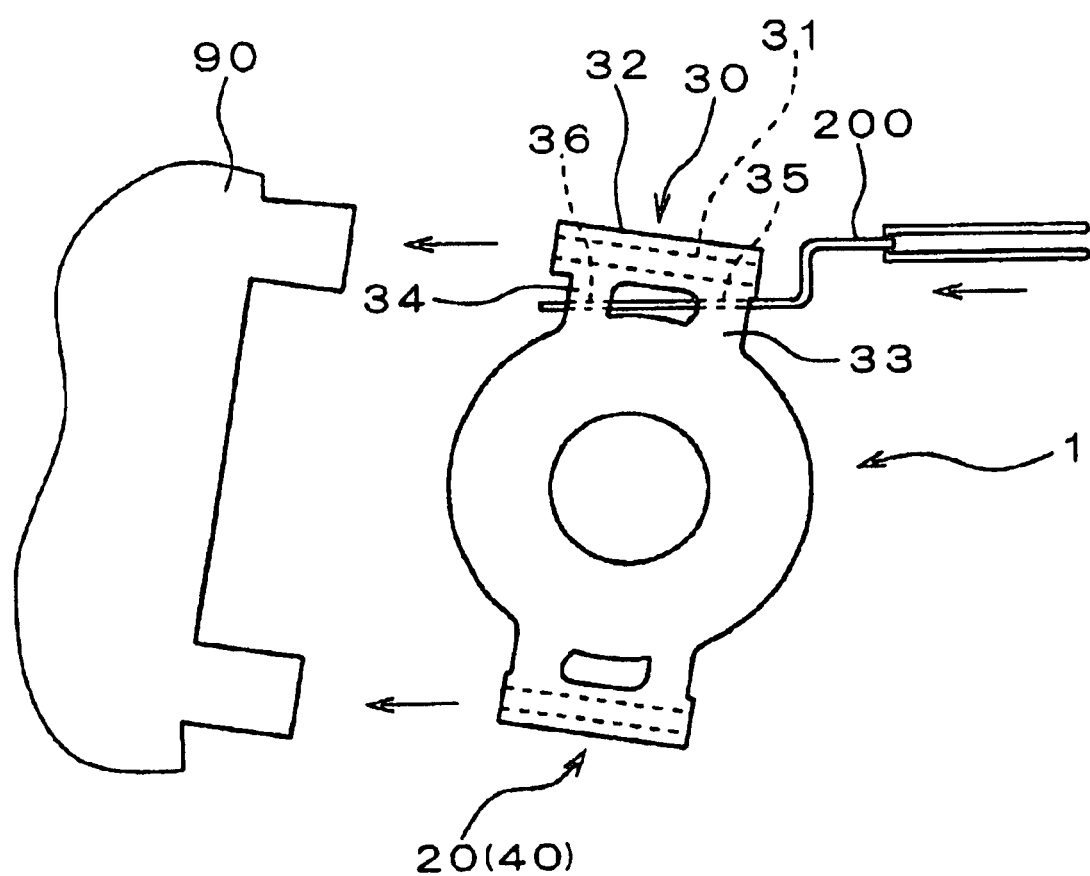
FIG. 6 is a diagram for illustrating an operation of mounting the embodiment on an engine block.

FIG. 6 is a diagram for illustrating the operation of mounting the alternator 1 on the engine block 90. After the carrier jig 200 has been passed through the carrier holes 35, 36 so that it can then retain and support the alternator 1, the carrier jig 200 is moved horizontally towards the engine block 90, to set the alternator 1 into the appropriate position for being mounted on the engine block 90. Due to the fact that the carrier jig 200 passes through two carrier holes 35, 36, by orienting the carrier jig 200 horizontally or at an angle which is displaced from the horizontal, the carrier jig 200 can be used to retain the alternator 1 in an attitude whereby the attachment faces of the stays 20, 30,40 (i.e., the faces which abut directly against the engine block 90 when the alternator 1 has been attached to the engine block) are oriented vertically or at a required degree of slope with respect to the vertical, during the mounting operation.

In that way, the alternator 1 can readily be mounted on a side of the engine block 90, even if that side has a significant degree of slope from the vertical.

It can thus be understood that with the above embodiment, by providing the carrier holes 35, 36 as two through-holes that are formed at respectively separate locations on the alternator 1 but have a common central axis, so that the carrier jig 200 can be passed through both of these carrier holes 35, 36 along that common central axis and can thereby be used to retain and support the alternator 1 even if the carrier jig 200 is tilted from a horizontal orientation, it becomes possible to accurately maintain a suitable attitude of the alternator 1 during an operation of mounting the alternator 1 on a part of a vehicle such as the engine block.

As can be understood from the above, the embodiment enables the alternator 1 to be readily mounted on a part of a vehicle such as the engine block 90 even if there is a part of the vehicle equipment (such as the engine head) that protrudes horizontally above the location at which the alternator 1 is to be mounted. As is clear from FIG. 6, with the alternator 1 retained and supported on the carrier jig 200, the alternator 1 can be moved into the installation position without being obstructed, in such a case.

Moreover due to the fact that the carrier holes 35, 36 are oriented along a central axis that is not parallel to the axis of rotation of the rotor of the alternator 1, the direction along which the alternator 1 is moved, in order to be brought into the required position for mounting, can be arbitrarily selected.

Furthermore due to the fact that the carrier holes 35, 36 can be oriented along a central axis that is not parallel to the central axes of the bolt holes 21, 31, 40 of the alternator 1, it thereby becomes possible to move the alternator 1 into the mounting position along a direction that is not parallel to the central axes of the bolt holes, while at the same time holding the alternator 1 in an attitude that is appropriate (i.e., with respect to the orientation of the aforementioned attachment faces of the attachment stays 20, 30,40) for attaching the alternator 1 to a sloping side of the engine block 90.

Furthermore since the carrier holes 35, 36 are formed in the leg portions 33, 34, it is not necessary to form the front-end housing 10 with a special shape for the purpose of enabling the carrier holes 35, 36 to be formed therein. Hence, a minimum amount of alteration of a pre-existing design would be required for adding the carrier holes 35, 36, so that adding these would involve only a minimal amount of increased manufacturing cost.

It should be noted that the invention is not limited to the embodiment described above. For example, although with the above embodiment a pair of carrier holes 35, 36 are utilized, it would b equally possible to replace one or both of the carrier holes 35, 36 with a slot or groove (i.e., which would have an upwardly concave shape, as seen in a side view such as that of FIG. 1). It will be apparent that by forming each such carrier slot with a suitable configuration, with each aligned along a common axis as described for the axis "a" shown in FIGS. 4, 5, the alternator 1 could be retained and supported by a member such as the carrier jig 200 that passes through two carrier slots (or one carrier slot and one carrier hole), in a similar manner to that described above for the case of using the carrier holes 35, 36.

Furthermore although with the above embodiment a pair of carrier holes 35, 36 are used, it would be equally possible to form additional carrier holes. For example referring to FIG. 2, it would be possible to form additional carrier holes (or carrier slots) in the leg portions of the attachment stay 20 or of the attachment stay 40, and to use an additional carrier jig (i.e., in addition to the carrier jig 200) to retain and support the alternator 1. In that way, the attitude in which the alternator 1 is held during the mounting operation could be even more accurately established.

Furthermore although with the above embodiment the carrier holes 35, 36 are formed in the leg portions 33, 34 of the attachment stay 30, it would be equally possible to provide radially outward-protruding portions of the front-end housing 10 or of the rear-end housing 12 for the specific purpose of forming the carrier holes 35, 36 therein.

Furthermore although the above embodiment has been described for the case of a side-mounted alternator, the invention could equally be applied for example to a vehicle alternator in which the central axes of the bolt holes 21, 31, etc., are oriented parallel to the axis of rotation of the rotor of the alternator.

Moreover with the above embodiment as can be understood from FIGS. 3, 4 the central axis "b" of the bolt hole 31 is oriented such as not to be parallel to the central axis "a" of the carrier holes 35, 36. However it would be equally possible to form the carrier holes 35, 36 with a common central axis that is parallel to the axis "b" of the bolt hole 31.

Similarly with the above embodiment the common central axis "a" of the carrier holes 35, 36 is oriented such as not to be parallel to the axis of rotation "c" of the rotor of the alternator 1. However it would be equally possible to form the carrier holes 35, 36 with a common central axis that is parallel to that axis of rotation. In that case, it would not be possible to form the carrier holes 35, 36 in the leg portions 33, 34, so that it would be necessary to provide radially outward-protruding portions on the front-end housing 10 or rear-end housing 12, for the purpose of forming the carrier holes 35, 36 therein.

Furthermore with the above embodiment, the two carrier holes 35, 36 are oriented along a common central axis "a". However that is not absolutely essential, and it would also be possible to form the carrier holes 35, 36 with respective central axes that are separate but are parallel to one another, or which are not parallel to one another. However in such a case it would not be possible to use only a single carrier jig 200 having a portion with a rod-shaped configuration that is passed through both of the carrier holes 35, 36, i.e., it would be necessary to use an additional carrier jig.

What is claimed is:

1. A vehicle-use alternator having a housing that contains a rotor and stator and is formed with attachment holes for use during an operation of mounting said vehicle-use alternator in a vehicle, wherein said housing comprises a plurality of carrier portions for use in retaining and supporting said vehicle-use alternator during said mounting operation, each of said carrier portions being formed of at least one through-hole or groove, and said carrier portions being formed at a plurality of different locations on said vehicle-use alternator.

2. A vehicle-use alternator as claimed in claim 1, wherein said through-holes or grooves constituting said carrier portions have respective central axes thereof oriented along a common axis.

3. A vehicle-use alternator as claimed in claim 1, wherein each of said through-holes or grooves constituting said carrier portions has a central axis oriented in a direction that is other than parallel to an axis of rotation of said rotor of said vehicle-use alternator.

4. A vehicle-use alternator as claimed in claim 1, wherein said attachment holes have respective central axes that are oriented in parallel with one another, and wherein each of said through-holes or grooves formed in said carrier portions has a central axis oriented in a direction that is other than parallel to said central axes of said attachment holes.

5. A vehicle-use alternator as claimed in claim 1, wherein said attachment holes have respective central axes that are oriented in parallel with a common direction, that common direction being other than parallel to an axis of rotation of said rotor of said vehicle-use alternator.

6. A vehicle-use alternator as claimed in claim 1, wherein said carrier portions are formed in a plurality of attachment stays of said vehicle-use alternator, with each said attachment stay having a corresponding one of said attachment holes formed therein.

* * * * *